US009805445B2

(12) United States Patent
Lin et al.

(10) Patent No.: US 9,805,445 B2
(45) Date of Patent: Oct. 31, 2017

(54) IMAGE ZOOMING (71) Applicant: Adobe Systems Incorporated, San Jose, CA (US)

(72) Inventors: Zhe Lin, Fremont, CA (US); Radomir Mech, Mountain View, CA (US); Xiaohui Shen, San Jose, CA (US); Brian L. Price, San Jose, CA (US); Jianming Zhang, Newton, MA (US)

(73) Assignee: Adobe Systems Incorporated, San Jose, CA (US)

( * ) Notice: Subject to any disclaimer, the term of this patent is extended or adjusted under 35 U.S.C. 154(b) by 88 days.

(21) Appl. No.: 14/524,489

(22) Filed: Oct. 27, 2014

(65) Prior Publication Data
US 2016/0117798 A1    Apr. 28, 2016

(51) Int. Cl.
*G06T 3/40*    (2006.01)
(52) U.S. Cl.
CPC ...................... *G06T 3/40* (2013.01)
(58) Field of Classification Search
None
See application file for complete search history.

(56) References Cited

U.S. PATENT DOCUMENTS

| | | | |
|---|---|---|---|
| 6,654,506 B1 * | 11/2003 | Luo | G06K 9/3233 345/620 |
| 7,747,107 B2 * | 6/2010 | Avidan | G06T 3/0012 382/254 |
| 8,660,351 B2 * | 2/2014 | Tang | G06K 9/3233 382/173 |
| 9,070,182 B1 * | 6/2015 | Chua | G06T 3/0012 |
| 9,158,455 B2 * | 10/2015 | Bhatt | G06F 3/04845 |
| 9,355,432 B1 * | 5/2016 | Goldman | G06T 3/0012 |
| 2002/0191861 A1 * | 12/2002 | Cheatle | G06K 9/38 382/282 |
| 2006/0188173 A1 * | 8/2006 | Zhang | H04N 7/0122 382/276 |
| 2013/0108175 A1 * | 5/2013 | Ptucha | G06T 11/60 382/199 |

(Continued)

OTHER PUBLICATIONS

Liu, Ligang, et al. "Optimizing photo composition." Computer Graphics Forum. vol. 29. No. 2. Blackwell Publishing Ltd, 2010.*

(Continued)

*Primary Examiner* — Yu Chen
(74) *Attorney, Agent, or Firm* — Wolfe-SBMC (57) ABSTRACT

Image zooming is described. In one or more implementations, zoomed croppings of an image are scored. The scores calculated for the zoomed croppings are indicative of a zoomed cropping's inclusion of content that is captured in the image. For example, the scores are indicative of a degree to which a zoomed cropping includes salient content of the image, a degree to which the salient content included in the zoomed cropping is centered in the image, and a degree to which the zoomed cropping preserves specified regions-to-keep and excludes specified regions-to-remove. Based on the scores, at least one zoomed cropping may be chosen to effectuate a zooming of the image. Accordingly, the image may be zoomed according to the zoomed cropping such that an amount the image is zoomed corresponds to a scale of the zoomed cropping.

20 Claims, 6 Drawing Sheets

(56) References Cited

U.S. PATENT DOCUMENTS

2014/0232821 A1* 8/2014 Chamaret ............ G06T 3/0012
                                              348/43
2015/0262333 A1* 9/2015 Chua ................... G06T 3/0012
                                              382/199

OTHER PUBLICATIONS

Zhang, Mingju, et al. "Auto cropping for digital photographs." Multimedia and Expo, 2005. ICME 2005. IEEE International Conference on. IEEE, 2005.*

* cited by examiner

IMAGE ZOOMING

BACKGROUND

Traditionally, people who used cameras for film photography were at least somewhat concerned about composing photos taken with such cameras to be visually pleasing. Once taken, there was little, if anything, people who did not develop their own film could do to improve their photos. Consequently, a photo that was not visually pleasing when taken generally resulted in a developed photo that also was not visually pleasing.

In digital photography, however, a photo that is not visually pleasing when taken may, through photo processing techniques, result in a visually pleasing (e.g., well-composed) photo. For example, a user with a digital camera may take a photo without being concerned generally about the composition of the photograph, such as whether the photo adheres to any of "the rules" of photography, e.g., rule-of-thirds, balancing elements, leading lines, and the like. Instead, the user may simply capture portions of a scene that they want to ensure are included in a final version of the photo. Given the digital photograph and a photo-editing application, a user may then perform a number of tasks to improve the photo, such as zooming in on a sub region of the photo, adjusting the contrast of the photo, adjusting the brightness of the photo, adjusting the sharpness of the photo, applying a colored or black-and-white filter to the photo, and so on.

One of the most frequently performed tasks in photograph processing is image zooming. Generally, the goal of zooming is to expand a sub region of the image so that it can take the place of the image, e.g., in a viewing window, as a printed photograph, and so on. Consider an example in which an image has a width of six inches a height of four inches. A zooming operation performed relative to such an image may expand a sub region of that image (e.g., one having a width of three inches and a height of two inches) so that the sub region has a width of six inches and a height of four inches. Additionally, the zooming operation may involve removing portions of the image outside this sub region so that just the portion of the image within the sub region remains. Further, the zooming operation may simply cause the sub region to fill a display window previously filled by the entire image. In any case, users who are not familiar with "the rules" of photography, knowing when those rules may be broken, and/or who do not have a good "eye" for capturing a scene, may perform a zooming operation on an image in a way that results in a poorly composed image. Furthermore, manually zooming multiple photos may be time-consuming.

SUMMARY

Image zooming is described. In one or more implementations, zoomed croppings of an image are scored. The scores calculated for the zoomed croppings are indicative of a zoomed cropping's inclusion of content captured by the image. For example, the scores are indicative of a degree to which a zoomed cropping includes salient content of the image, a degree to which the salient content included in the zoomed cropping is centered in the image, and a degree to which the zoomed cropping preserves specified regions-to-keep and excludes specified regions-to-remove.

Further, each of the zoomed croppings corresponds to one of multiple predefined scales, each of which is indicative of an amount the image is zoomed to result in a respective zoomed cropping (e.g., 1.5× zoom, 2× zoom, 4× zoom, 16× zoom, and the like). Based on the scores, a zoomed cropping may be chosen at each of the predefined scales, such as a highest-scoring zoomed cropping at each of the scales. From these chosen zoomed croppings, a zoomed cropping may be selected to effectuate a zooming of the image. Accordingly, the image may be zoomed according to the zoomed cropping such that an amount the image is zoomed corresponds to the scale of the zoomed cropping.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional techniques for zooming images may be time consuming for a user. Even if a user is willing to spend time manually zooming in on regions of their photos and then cropping those photos at the level zoomed, the resulting images may fail to include some content that is important to the composition of the image.

Image zooming is described. In one or more implementations, a variety of zooming characteristics may be used to suggest zoomed croppings of an image to a user. Zoomings that are considered to best maintain the content of the image from which they are derived have the characteristics that they include content of the image that is determined to be important, have the content centered that is determined to be important, and honor regions of interest, e.g., faces recognized in the image. Accordingly, multiple zoomed croppings of an image may be analyzed with regard to such characteristics to determine a zoomed cropping that maintains the content of the image to a greater degree than other croppings.

For example, a whole-cropping salient content score may be calculated for a particular zoomed cropping that indicates a degree to which the zoomed cropping includes content of the image that is considered to be important. Further, a centered-region salient content score may be calculated that indicates a degree to which salient content in a zoomed cropping is centered. A score may also be calculated that indicates how well a zoomed cropping honors regions of interest, e.g., includes regions-to-keep and excludes regions-to-remove that have been specified. These scores may then be combined to compute an overall zooming score for a zoomed cropping.

Based on the zooming scores, a best (e.g., highest scoring) zoomed cropping at each zoom level considered may be added to a list of croppings. Accordingly, the list may include a highest-scoring zoomed cropping from each of multiple different levels of zoom. From this list, some of the zoomed croppings may be chosen to suggest to a user. To suggest the chosen zoomed croppings, a user interface may display windows over an image that each correspond to a zooming of the image. When suggesting zoomed croppings for a scene that has yet to be captured, the windows may be displayed over a portion of the interface through which the scene is viewed in real-time. In any case, a user may select a suggested zoomed cropping though the user interface. Responsive to the selection, the image may be zoomed according to the selected zoomed cropping. When the selection is performed relative to a scene that has yet to be captured, the scene may be captured at a zoom level that corresponds to the selected cropping.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
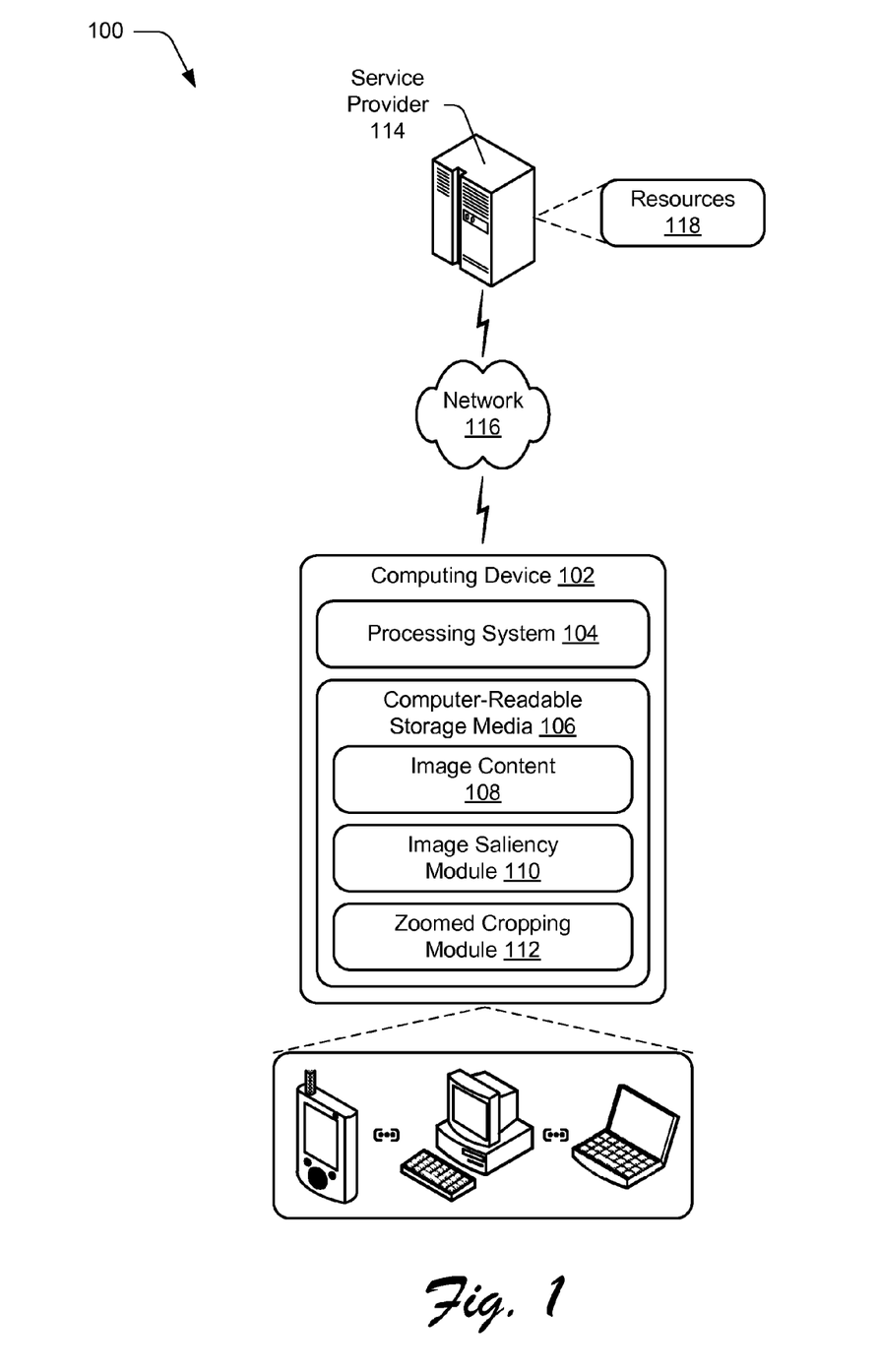
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 having a processing system 104 that may include one or more processing devices (e.g., processors) and one or more computer-readable storage media 106. The illustrated environment 100 also includes image content 108, an image saliency module 110, and a zoomed cropping module 112 embodied on the computer-readable storage media 106 and operable via the processing system 104 to implement corresponding functionality described herein. In at least some implementations, the computing device 102 may include functionality to access various kinds of web-based resources (content and services), interact with online providers, and so forth as described in further detail below.

The computing device 102 may be configured as any suitable type of computing device. For example, the computing device 102 may be configured as a server, a desktop computer, a laptop computer, a mobile device (e.g., assuming a handheld configuration such as a tablet or mobile phone), a tablet, a camera (point-and-shoot, single lens reflex (SLR), video recorder, and so on), a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 7.

The environment 100 further depicts one or more service providers 114, configured to communicate with computing device 102 over a network 116, such as the Internet, to provide a "cloud-based" computing environment. Generally speaking, service providers 114 are configured to make various resources 118 available over the network 116 to clients. In some scenarios, users may sign up for accounts that are employed to access corresponding resources from a provider. The provider may authenticate credentials of a user (e.g., username and password) before granting access to an account and corresponding resources 118. Other resources 118 may be made freely available, (e.g., without authentication or account-based access). The resources 118 can include any suitable combination of services and/or content typically made available over a network by one or more providers. Some examples of services include, but are not limited to, photo printing services (e.g., Snapfish®, Shutterfly®, and the like), photo storage and/or sharing services (e.g., Flickr®), social network services (e.g., Facebook®, Twitter®, Instagram®, and the like), and so forth.

These sources may serve as significant amounts of image content. Such image content may be formatted in any of a variety of image formats, including but not limited to JPEG, TIFF, RAW, GIF, BMP, PNG, and so on. The image content made available through the services may be posted by users that have accounts with those services. For example, a user having an account with a photo storage and/or sharing service may upload images, such as those taken with a digital camera of the user, or those sent to the user via electronic means. A user of the photo storage and/or sharing service may then share their uploaded images with others, such as by providing a link to photo albums or to a profile of the user.

The image saliency module 110 and zoomed cropping module 112 may represent functionality to implement image zooming techniques described herein. For example, the image saliency module 110 may be configured in various ways to generate multiple different saliency maps for an image. The image saliency module 110 may, for instance, compute a saliency map for an image or a particular cropping of an image.

Using these saliency maps, the zoomed cropping module 112 may be configured in various ways to suggest zoomed croppings of an image to a user. To do so, the zoomed cropping module 112 may score zoomed croppings of an image based on a degree to which the zoomed croppings include salient content, the degree to which salient content is centered in the zoomed croppings, and/or the degree to which the zoomed croppings preserve regions-to-keep and exclude regions-to-remove. Regions-to-keep may refer to regions of the image that a user has indicated should be included in a cropping of the image, one or more objects (e.g., faces) that are automatically detected in the image by the zoomed cropping module 112 (or other module) and without user interaction as being important, and so on. Regions-to-remove may refer to regions of the image that a user has indicated should not be included in a cropping of the image, one or more objects that are automatically detected in the image by the zoomed cropping module 112 (or other module) and without user interaction as being detrimental to the composition of the image (e.g., profanity captured in the image), and so on.

Once the zoomed croppings at a particular zoom level (e.g., 1.5× zoom, 2× zoom, 4× zoom, or 16× zoom) are scored, a best (e.g., highest) scoring zoomed cropping at that particular level may be added to a list of zoomed croppings. This process may be repeated so that a highest-scoring cropping at each of the considered zoom levels is added to the list of croppings. In an example in which croppings are derived at 1.5× zoom, 2× zoom, 4× zoom, and 16× zoom, this would result in a highest-scoring 1.5× zoom-cropping, a highest-scoring 2× zoom-cropping, a highest-scoring 4× zoom-cropping, and a highest-scoring 16× zoom-cropping being added to the list of croppings. From this list, one or more zoomed croppings may be chosen for suggestion to a user.

Suggested zoomed croppings may be presented to a user through a user interface for selection. In a photo-editing application, for instance, the image content 108 (e.g., a digital image) may be accessed from storage and zoomed croppings of the image content 108 suggested through the user interface, e.g., by displaying windows over the image that each correspond to a suggested zoomed cropping. Through the user interface, the user may select one of the suggested zoomed croppings (e.g., one of the windows). As a result of the selection, the corresponding zoom may be applied to the image such that regions of the image outside the selected window are removed or hidden, and those within the window remain. It should be noted that the region within the window may have a same aspect ratio as the original image so that the applied cropping appears to simply be zoomed in from the original image. By way of example, if the aspect ratio of the original image is 16:9, the aspect ratio of any suggested cropping may also be 16:9. It is to be appreciated that an image and resulting zoomed cropping may have aspect ratios other than 16:9 without departing from the scope of the techniques described herein.

The image saliency module 110 and zoomed cropping module 112 may be implemented as software modules, hardware devices, or using a combination of software, hardware, firmware, fixed logic circuitry, etc. Further, the image saliency module 110 and zoomed cropping module 112 may be implemented as standalone components of the computing device 102 as illustrated. In addition or alternatively, the image saliency module 110 and zoomed cropping module 112 may be configured as components of web services, applications, an operating system of the computing device 102, plug-in modules, or other device applications as further described in relation to FIG. 7.

Having considered an example environment, consider now a discussion of some example details of the techniques for image zooming in accordance with one or more implementations.

Image Zooming Details

Figure 2:
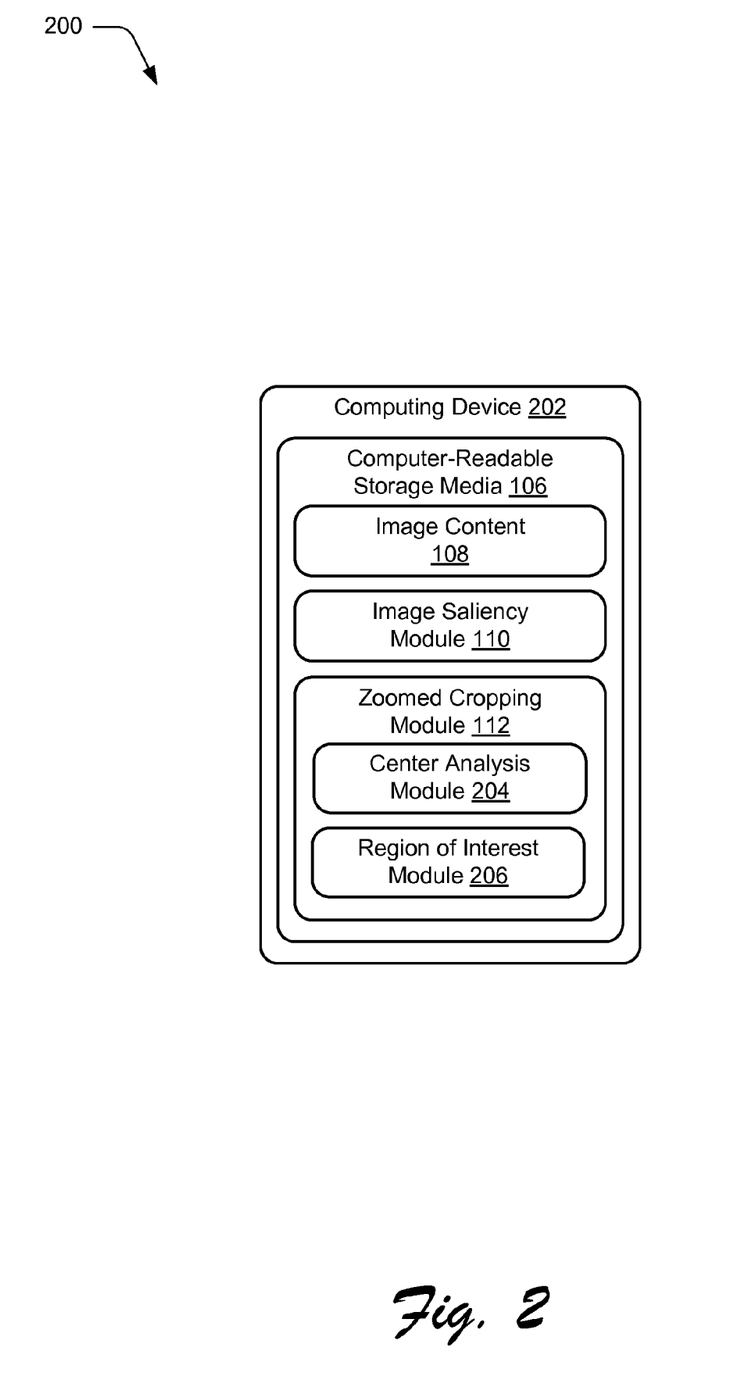
FIG. 2 illustrates from the environment of FIG. 1 a computing device having image saliency and zoomed cropping modules in greater detail.

This section describes some example details of image zooming techniques in accordance with one or more implementations. FIG. 2 depicts generally at 200 some portions of the environment 100 of FIG. 1, but in greater detail. In particular, the computer-readable storage media 106 of a computing device and the components included therein are depicted in greater detail.

In FIG. 2, the computer-readable storage media 106 is illustrated as part of computing device 202 and includes the image content 108, the image saliency module 110, and the zoomed cropping module 112. The zoomed cropping module 112 is illustrated with a center analysis module 204 and a region of interest module 206. These modules represent functionality of the zoomed cropping module 112 and it should be appreciated that such functionality may be implemented using more or fewer modules than those illustrated. The discussion of the center analysis module 204 and the region of interest module 206 refers to FIGS. 3 and 4, which illustrate concepts pertinent to the functionality of those modules.

In general, the image saliency module 110 is configured to compute saliency maps for an image as well as for portions thereof, e.g., zoomed croppings of an image. Broadly speaking, a saliency map represents a visual saliency of a scene depicted in an image at each location in the image, e.g., the saliency of the scene at each pixel of the image relative to the saliency of the scene at the other pixels. In general, visual "saliency" at a given location (e.g., a pixel of an image) refers to how different the given location is from its surroundings in terms of color, orientation, motion, depth, and so forth. In conjunction with visual information processing, a scene's visually "salient" information may be used to make a determination regarding which information of the scene is important.

The visual saliency of a particular pixel may be represented by a value or a vector that indicates a degree to which a pixel of an image is salient relative to other pixels of the image. By way of example, a high saliency value may indicate that a pixel is more salient than other pixels of an image e.g., the pixel, relative to the other pixels in the image, has a high degree of difference in terms of color, orientation, motion, depth, and so on from the other pixels in the image. Accordingly, a saliency map may represent a collection of saliency values for each pixel of an image.

In general, the zoomed cropping module 112 may employ the center analysis module 204 and the region of interest module 206 to score a zoomed image cropping over zooming characteristics of the zoomed cropping. To compute such scores for a zoomed cropping, these modules may utilize the saliency maps generated by the image saliency module 110. Prior to scoring the zoomed croppings of an image, however, the zoomed cropping module 112 may derive multiple zoomed croppings to be scored.

For a particular image, the zoomed cropping module 112 may derive multiple zoomed croppings that have a same aspect ratio as the image. If the image has an aspect ratio of 16:9, for instance, each of the zoomed croppings derived may also have an aspect ratio of 16:9. However, the zoomed croppings may be derived so that the image content included therein appears to be zoomed in from that of the image. By way of example, the zoomed cropping module 112 may derive multiple croppings of an image at each of 1.5× zoom, 2× zoom, 4× zoom, and 16× zoom. In other words, multiple croppings may be derived at 1.5× zoom, multiple croppings derived at 2× zoom, and so on. The corresponding zoom numbers (e.g., 1.5, 2, 4, and 16) represent a "scale" at which the image is zoomed to derive zoomed croppings. In relation to camera lenses, a 2× zoom refers to a lens for which a focal length can be changed to range from a first number (e.g., 100 millimeters) to a second number that is two times greater than the first number (e.g., 200 millimeters). Accordingly, if such a lens is positioned to have a focal length of 200 millimeters when capturing an image, the resulting image is said to have 2× zoom relative to an image captured when the lens is positioned to have a focal length of 100 millimeters.

Although 1.5× zoom, 2× zoom, 4× zoom, and 16× zoom are enumerated above, these are merely examples of zooming levels at which zoomed croppings may be derived. It should be appreciated that the zoomed cropping module 112 may derive croppings for different levels of zooming without departing from the spirit of the techniques described herein. Moreover, the zoomed cropping module 112 may derive zoomed croppings for more or fewer zoom levels than the four enumerated, e.g., zoomed croppings may be derived at one, two, three, five, six, seven, and so on different zoom levels.

The zoom levels at which the zoomed cropping module 112 derives croppings may be specified in a variety of manners. For example, the number of zoom levels and the scales (e.g., 1.5×) at which the croppings are derived may be based on default settings, such that by default the zoomed cropping module 112 derives zoomed croppings at the same scale(s) for each image. Alternately or in addition, the number of zoom levels and scales may be based on user input. A user may, for instance, indicate via input that they would like a zoomed cropping of an image at 4× zoom. In such a situation, the zoomed cropping module 112 may derive multiple croppings at 4× zoom, but no croppings at other zoom levels.

Regardless of how many zoom levels or which scales the zoomed cropping module 112 derives zoomed croppings for, the zoomed cropping module 112 scores the croppings by scale. In particular, each of the zoomed croppings taken at a scale may be scored, and a best (e.g., highest) scoring cropping at each scale may be added to a list of croppings. The list of zoomed croppings may thus include a "best" cropping at each scale and be used to suggest a zoomed cropping to a user. To score each of the croppings derived from a given image, the zoomed cropping module 112 may employ the center analysis module 204 and the region of interest module 206.

In one or more implementations, the score for a zoomed cropping may be computed as a function of the degree to which the cropping includes salient content, the degree to which salient content is centered in the cropping, and/or the degree to which the cropping preserves regions-to-keep and excludes regions-to-remove. For example, the score for an image cropping $S_i$ may be computed according to the following:

$$S_i = W_1 \cdot S_1^i + W_2 \cdot S_2^i + W_{ROI} \cdot S_{ROI}^i$$

The term $S_1^i$ represents a quantitative score indicative of a degree to which a cropping includes salient content of an image, e.g., a whole-cropping salient content score. The term $S_2^i$ represents a quantitative score indicative of a degree to which salient content in a cropping is centered in the cropping, e.g., a centered-region salient content score. The term $S_{ROI}^i$ represents a quantitative score indicative of a degree to which a cropping preserves regions-to-keep and excludes regions-to-remove. Regions-to-keep refer to regions of an image that have been selected to keep in a cropping of the image. These regions may be selected by a user or may be selected automatically by a variety of modules of the computing device 202. Faces or people captured in an image may be examples of regions that are selected for keeping in a zoomed cropping. On the other hand, regions-to-remove refer to regions of an image that have been selected to remove from a cropping of an image. Like regions-to-keep, these may be selected by a user, or automatically by modules of the computing device 202.

In the equation above the terms $W_1$, $W_2$, and $W_{ROI}$ are constant weights applied respectively to the terms $S_1^i$, $S_2^i$, and $S_{ROI}^i$. These weights may be learned by the zoomed cropping module 112 over time, e.g., based on which zoomed croppings suggested to a user are selected by the user. These weights may also be set by a user according to personal preference. For example, a user may give more importance to the characteristics that a cropping include regions-to-keep and exclude regions-to-remove. Accordingly, the user may select to more heavily weight the region of interest score $S_{ROI}^i$. If a user finds that it is important for a cropping to simply include salient content or to have the salient content centered, however, the user may select to more heavily weight $S_1^i$ or $S_2^i$.

Although the equation specified above to compute the score for a zoomed cropping $S_i$ has a linear functional form, the zoomed cropping module 112 may also be configured compute $S_i$ using a non-linear function (not shown). Furthermore, the zoomed cropping module 112 may be configured to compute the score for an image cropping using a subset of the degree to which the cropping includes salient content, the degree to which salient content is centered in the cropping, and/or the degree to which the cropping preserves regions-to-keep and excludes regions-to-remove. For example, the zoomed cropping module 112 may compute $S_i$ as a function of just its salient content included and salient content centered. Alternately, the zoomed cropping module 112 may compute $S_i$ as a function of just a single parameter, e.g., a function of just the degree to which the cropping includes salient content, just the degree to which salient content is centered in the cropping, or just the degree to which the cropping preserves regions-to-keep and excludes regions-to-remove. In one or more implementations, the zoomed cropping module 112 may compute $S_i$ using parameters in addition to the salient content included in the cropping, the salient content centered in the cropping, and the inclusion or exclusion of regions of interest of the cropping.

As described above, once score $S_i$ is computed for each of the zoomed croppings at a given scale, the zoomed cropping module 112 may add a highest scoring cropping of the scale to a list of candidate zoomed croppings. As also described above, the zoomed cropping module 112 may do so for each of the zoom levels at which croppings are derived. In this way, the list of candidate zoomed croppings may include a best (e.g., highest) scoring cropping from each zoom level. From this list, the zoomed cropping module 112 may choose a cropping for suggestion. To do so, the zoomed cropping module 112 may compute a selection score $S_{SEL}^i$ for the croppings included in the list according to the following:

$$S_{SEL}^i = \alpha \cdot S_{ROI} + \left(1 + \frac{\beta}{\text{Area of } C_i}\right) \cdot S_2^i$$

In this equation, the terms $\alpha$ and $\beta$ are constants, and the "Area of $C_i$" is the area of the current cropping from the list for which the selection score $S_{SEL}^i$ is being computed. Once a selection score is computed for each of the croppings included in the list, the cropping selection module 112 may select one or more croppings based on the computed selection scores for suggestion to a user. By way of example, the cropping selection module may select the zoomed cropping with the best (e.g., highest) selection score. In one or more implementations, more than one of the zoomed croppings from the list of croppings may be selected for suggestion to a user.

Once one or more zoomed croppings are chosen from the list of zoomed croppings, they may be presented to a user. The zoomed croppings may be suggested through a user interface of a photo-editing application, for example. To do so, the user interface of the photo-editing application may present cropping windows over the image that is to be zoomed. Through the user interface, a user may select a suggested zoomed cropping. The image may then be zoomed according to and as a result of the selection. The user interface may also enable a user to select more than one suggested zoomed cropping. When multiple zoomed croppings are selected, the multiple selected croppings may be effective to create multiple resulting zoomed images (e.g., separate image files).

Additionally, zoomed croppings may be suggested through a user interface used to view a scene in real-time. For example, a device (e.g., a camera, a phone, and so on) may display a particular interface for capturing images. In addition to including the scene that is to be captured, the user interface may also display suggested zoomed croppings of the scene. The user interface may enable a user to select one of those zoomed croppings. As a result of the selection, the device (e.g., the camera, the phone, and so on) may zoom in on the scene to capture an image according to the selected zoomed cropping. The user interface may also be configured to instruct a user to perform actions with the device to enable the device to zoom so that the image is captured according to a suggested cropping. For example, the user interface may instruct the user to zoom in a particular amount and to pan left, pan right, pan up, pan down, adjust the focus, and so on. Once the user has performed such actions, the user interface may enable the user to capture the image according to the selected cropping.

Having discussed the general functionality of the image saliency module 110 and the zoomed cropping module 112, the center analysis module 204 and the region of interest module 206, which are employed to score multiple zoomed croppings at one or more scales, are now discussed.

Center Analysis Module

The center analysis module 204 represents functionality to determine an extent to which a zoomed cropping of an image includes salient content of the image and an extent to which included salient content is positioned at a center of the cropping. To make these determinations, the center analysis module 204 may determine which features in an image correspond to salient content, e.g., faces included in an image. Salient content may be identified from a saliency map of the image.

Once the salient content is identified, the center analysis module 204 may determine portions of salient content that are included in a cropping C of the image, and portions of the salient content that are included in a smaller-centered-region $\hat{C}$ of the cropping. The smaller-centered-region $\hat{C}$ of the cropping may have a same aspect ratio as the cropping C, and be centered at a center of the cropping C. As the name implies, however, the smaller-centered-region is smaller (e.g., has a smaller size) than the cropping. For example, the smaller-centered-region may be 50% smaller than the cropping. It should be appreciated that the smaller-centered-region may be a variety of sizes other than 50% smaller than the cropping without departing from the spirit or scope of the techniques described herein.

As discussed above, a zoomed cropping may be scored based on a degree to which the cropping includes salient content of an image and a degree to which salient content in the cropping is centered. The whole-cropping salient content score $S_1^i$ may be computed as a ratio of salient content included in a cropping C to that of the image from which the cropping is derived. In one example, the center analysis module 204 may compute the whole-cropping salient content score as follows:

$$S_1^i = \frac{\sum_{p \in C_1} S(p)}{\sum_{p \in K} S(p)}$$

In this equation, the term S(p) represents a saliency value of a pixel under consideration. The term K represents a pixel index of the entire image from which the cropping C was taken. The result of this equation is to score croppings higher (e.g., better) that not only have more pixels with salient content but also have pixels with content that is more salient than other pixels. Since the numerator represents a sum of saliency values of a cropping's pixels, a situation may occur in which a first cropping is scored higher than a second cropping that has a greater number of salient pixels because the salient pixels of the first cropping are more salient (according to the saliency values) than the salient pixels of the second cropping. Alternately, a first cropping may be scored lower than a second cropping that has a greater number of salient pixels if the salient pixels of the first cropping are equally or less salient (according to the saliency values) than the salient pixels of the second cropping.

In addition to the whole-cropping salient content score $S_1^i$, a centered-region salient content score $S_2^i$ may also be computed. The centered-region salient content score $S_2^i$ may be computed as a ratio of salient content included in the smaller centered-region $\hat{C}$ to that of the image from which the cropping is derived. In one example, the center analysis module 204 may compute the centered-region salient content score as follows $$S_2^i = \frac{\sum_{p \in \hat{C}_1} S(p)}{\sum_{p \in K} S(p)}$$

As in the equation above, the term S(p) represents the saliency value of a pixel under consideration, and the term K represents the pixel index of the entire image from which the cropping C was taken. In contrast to the equation above, however, the result of this equation is to score croppings higher (e.g., better) that both have more pixels with salient content included in the smaller-centered-region and have pixels in the smaller-centered-region with content that is more salient than other pixels. Since the numerator represents a sum of saliency values for the pixels in a cropping's smaller-centered-region, a situation may occur in which a first cropping is scored higher than a second cropping that has a greater number of salient pixels in its smaller-centered-region. This may occur because the salient pixels in the smaller-centered-region of the first cropping are more salient (according to the saliency values) than the salient pixels in the smaller-centered-region of the second cropping. Alternately, a first cropping may be scored lower than a second cropping that has a greater number of salient pixels in its smaller-centered-region, if the salient pixels in the smaller-centered-region of the first cropping are equally or less salient (according to the saliency values) than the salient pixels in the smaller-centered-region of the second cropping.

Figure 3:
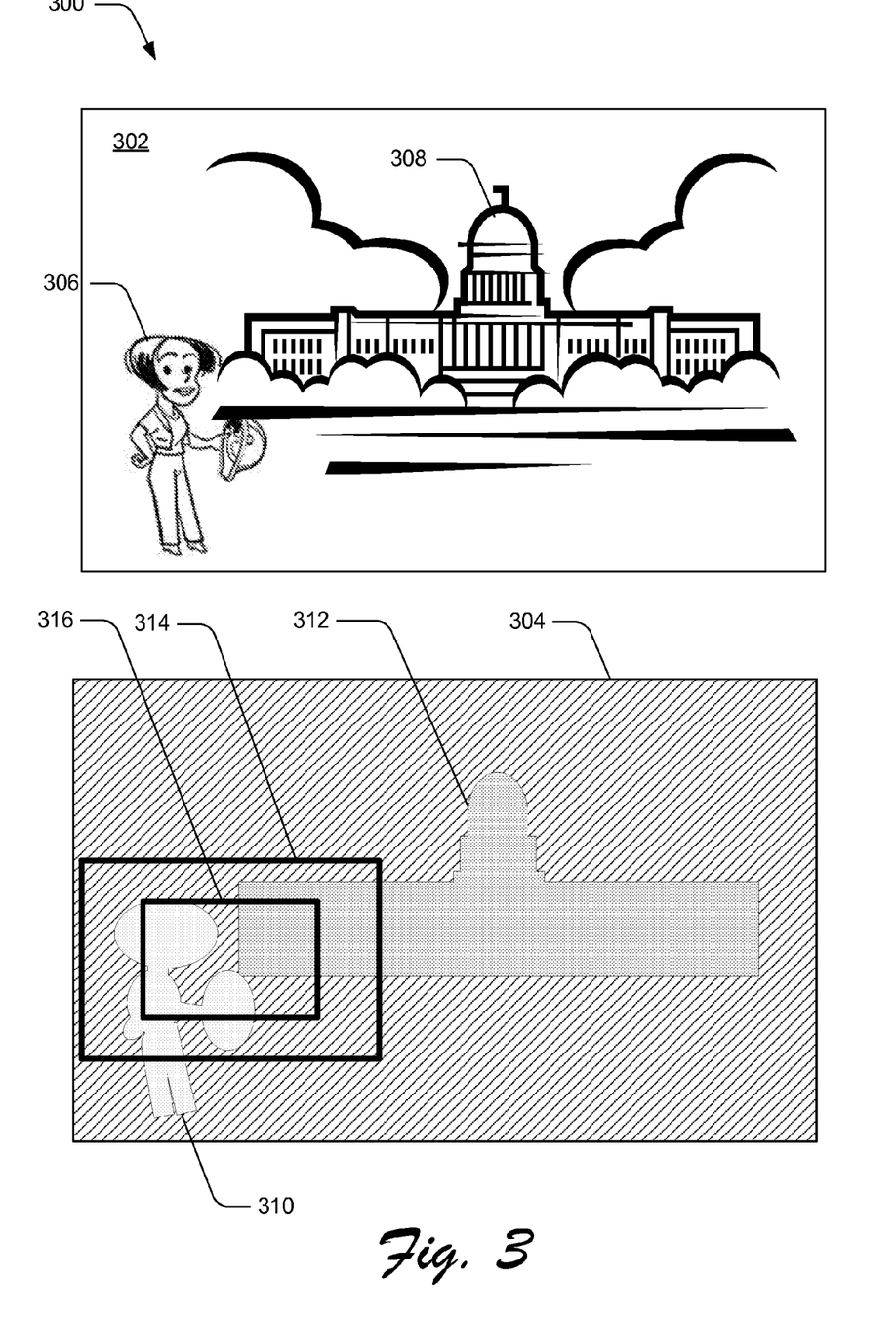
FIG. 3 illustrates an example of information derived from an image that may be used to score a zoomed cropping of the image on a degree to which the cropping includes salient content of an image and a degree to which salient content in the cropping is centered.

FIG. 3 illustrates an example of information derived from an image that may be used to score a zoomed cropping on the degree to which the cropping includes salient content of an image and the degree to which salient content in the cropping is centered. In particular, FIG. 3 illustrates at 300 an image 302 and a representation 304 of a saliency map that may be derived from the image 302. The image 302 includes person 306 and monument 308. In the representation 304 of the saliency map, the person 306 is represented by corresponding shape 310 and monument the 308 is represented by corresponding shape 312. The corresponding shapes 310, 312 in the representation 304 of the saliency map indicate that the person 306 and the monument 308 are salient (e.g., important) content of image 302. In this example, the corresponding shapes 310, 312 also indicate that the person 306 is more salient (e.g., important) than the monument 308.

FIG. 3 also illustrates a zoomed cropping 314 of the image and a smaller-centered-region 316 of the zoomed cropping. The zoomed cropping 314 may correspond to a cropping C of the image 302 and the smaller-centered-region 316 may correspond to the smaller-centered-region Ĉ. Thus, the whole-cropping salient content score $S_1^i$ may be computed relative to the zoomed cropping 314, and the centered-region salient content score $S_2^i$ may be computed relative to the smaller-centered-region 316.

A score computed for the zoomed cropping 314 may reflect its inclusion of salient content of the image, e.g., the inclusion in the zoomed cropping 314 of a portion of the person 306 and a portion of the monument 308. Moreover, the score computed for the zoomed cropping 314 may be higher (e.g., better) than a score for a different cropping (not shown) that includes the monument 308 but not the person 306 (or less of the person). This is because in this example the person 306 is considered to be more salient than the monument 308. The score computed for the zoomed cropping 314 may also reflect the inclusion of salient content in the smaller-centered-region 316, e.g., the inclusion of a portion of the person 306 and a portion of the monument 308 in the smaller-centered-region 316. The score for the zoomed cropping 314 may be higher than a score for a different cropping (not shown) that includes in its smaller-centered-region the monument 308 but not the person 306 (or less of the person 306).

In any case, the whole-cropping salient content score $S_1^i$ and the centered-region salient content score $S_2^i$ may be computed for each candidate zoomed cropping. In addition to being scored based on the degree to which salient content is included and the degree to which that content is centered, a zoomed cropping of an image may also be scored based on the extent to which it includes regions-to-keep and excludes regions-to-remove.

Region of Interest Module

The region of interest module 206 represents functionality to score a zoomed cropping of an image based on an extent to which the zoomed cropping honors regions of interest. By way of example, regions of interest may include regions-to-keep and regions-to-remove. Regions-to-keep may refer to regions of the image that a user has indicated should be included in a cropping of the image, one or more objects (e.g., faces) that are automatically detected in the image by the zoomed cropping module 112 (or other module) as being important, and so on. Regions-to-remove may refer to regions of the image that a user has indicated should not be included in a cropping of the image, one or more objects that are automatically detected in the image by the zoomed cropping module 112 (or other module) as being detrimental to the composition of the image (e.g., profanity captured in the image), and so on.

Figure 4:
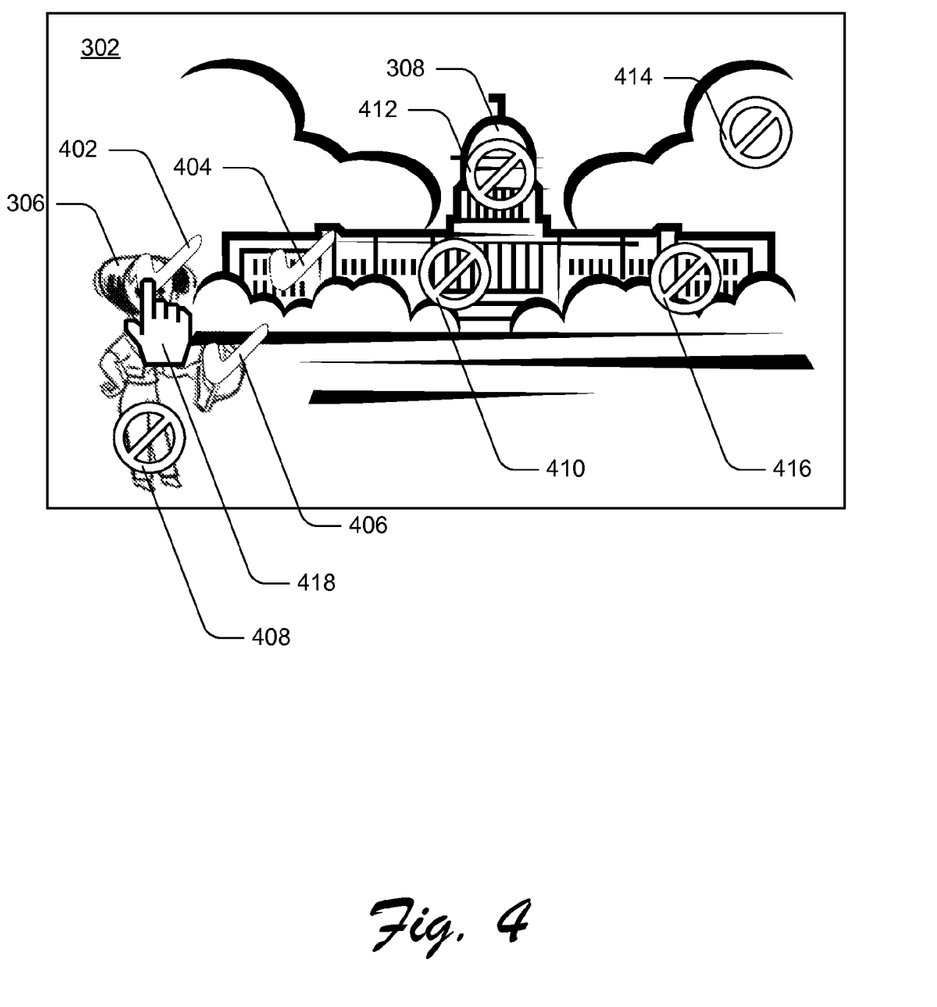
FIG. 4 illustrates an example of an image having specified regions of interest displayed.

FIG. 4 illustrates an example of an image having specified regions of interest displayed. In particular, FIG. 4 illustrates at 400 the image 302 from FIG. 3, having regions-to-keep 402, 404, 406 and regions-to-remove 408, 410, 412, 414, 416 displayed therewith. Included in FIG. 4 is also cursor 418. Accordingly, the cursor 418 may have been used to specify at least some of the regions-to-keep 402, 404, 406 and the regions-to-remove 408, 410, 412, 414, 416.

By way of example, an application may enable a user, through a user interface, to select regions of the image 302 and designate them as a region-to-keep or a region-to-remove. Regarding region-to-keep 402, for instance, a user may move the cursor 418 to a location of the image 302 associated with region-to-keep 402. The user may perform an input to designate that location as a region-to-keep. For example, the application may be in a mode in which a single input (e.g., such as a mouse click, single-tap touch input, and so on) is configured to designate the location as a region-to-keep. This mode may be entered in response to a user selecting to enter the mode from a menu of the user interface.

It should be appreciated that the user may enter a similar mode to designate regions-to-remove, e.g., so that single inputs are configured to designate locations of the image 302 as regions-to-remove. Alternately or in addition, a user may select a location of the image 302 (e.g., with a right mouse click), and the selection may cause display of a menu (not shown). From the displayed menu, the user may be able to select an option to designate the location as a region-to-keep or a region-to-remove. The displayed menu may enable the user to perform other actions relative to the location (e.g., paste, match color, get information, and so forth) without departing from the scope of the techniques described herein.

Although the cursor 418 is depicted in FIG. 4, it may not have been used to select each of the regions-to-keep 402, 404, 406 and the regions-to-remove 408, 410, 412, 414, 416. Rather, an application may have automatically selected the regions-to-keep 402, 404, 406 and the regions-to-remove 408, 410, 412, 414, 416 using various object recognition techniques, e.g., facial recognition, optical character recognition, and so on. Region-to-keep 402, for instance, may have been automatically selected by a facial-recognition module of an application. In addition to facial recognition techniques, other techniques may be employed to recognize objects in an image, such as optical character recognition techniques for recognizing words in the image. It should be appreciated that some of the regions-to-keep 402, 404, 406 and the regions-to-remove 408, 410, 412, 414, 416 may be selected automatically by an application (or modules thereof) while others are selected by a user, e.g., using the cursor 418 or touch input. Further, it should be appreciated that a user may override automatic region of interest selections made by an application or module. A user may, for instance, select an automatically designated region of interest which causes a menu to be displayed (again, not shown).

In addition to or instead of the menu actions enumerated above, the menu may include an option to remove a region's designation as a region of interest. Upon selection of such an option, the automatically designated region may no longer be considered a region of interest.

In any case, when at least one region of interest (e.g., a region-to-keep or region-to-remove) has been designated, the region of interest module 206 may compute the region of interest score $S_{ROI}{}^i$. The region of interest score $S_{ROI}{}^i$ represents the extent to which a given cropping preserves regions-to-keep and excludes regions-to-remove. The region of interest module 206 may compute the $S_{ROI}{}^i$ according to the following:

$$S_{ROI}^i = \begin{cases} 1, & S_1^i = 1 \\ S_1^i + S_2^i \cdot 10^{-1} + S_3^i \cdot 10^{-2}, & \text{otherwise} \end{cases}$$

The term $S_1{}^i$ represents a ratio of how many complete regions-to-keep (RK) a cropping includes and complete regions-to-remove (RR) the cropping excludes to a total number of RKs and RRs. The region of interest module 206 may compute $S_1{}^i$ as follows:

$$S_1^i = \frac{\text{number of } RKs \text{ completely included in } C_i + \text{number of } RRs \text{ completely outside } C_i}{\text{total number of } RKs + \text{total number of } RRs}$$

The term $S_2{}^i$ represents a ratio of how much area a cropping includes of the RKs and excludes of the RRs to the total area of the RKs and RRs. The region of interest module 206 may compute $S_2{}^i$ as follows:

$$S_2^i = \frac{\text{sum of area of } RKs \text{ covered by } C_i + \text{sum of area of } RRs \text{ NOT covered by } C_i}{\text{total area of } RKs + \text{total area of } RRs}$$

The term $S_3{}^i$ represents a measure of how centered RKs are in a given cropping. The region of interest module 206 may compute $S_3{}^i$ as follows:

$$S_3^i = \begin{cases} \exp\left(-\frac{\min_j dist(C_i, RK_j)}{\sigma^2}\right) & \text{at least 1 } RK \text{ is labeled} \\ 0 & \text{otherwise} \end{cases}$$

In this expression, the term $dist(C_i, RK_j)$ represents the center distance between $C_i$ and $RK_j$. This is but one way the region of interest score may be calculated to indicate how well a zoomed cropping includes regions-to-keep and excludes regions-to-remove. It should be appreciated that a score indicative of how well a cropping preserves regions-to-keep and excludes regions-to-remove may be calculated in other ways without departing from the scope of the techniques described herein.

Having discussed example details of the techniques for image zooming, consider now some example procedures to illustrate additional aspects of the techniques.

Example Procedures

This section describes example procedures for image zooming in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed by a suitably configured device, such as example computing devices 102, 202 of FIGS. 1 and 2 that make use of an image saliency module 110 and a zoomed cropping module 112.

Figure 5:
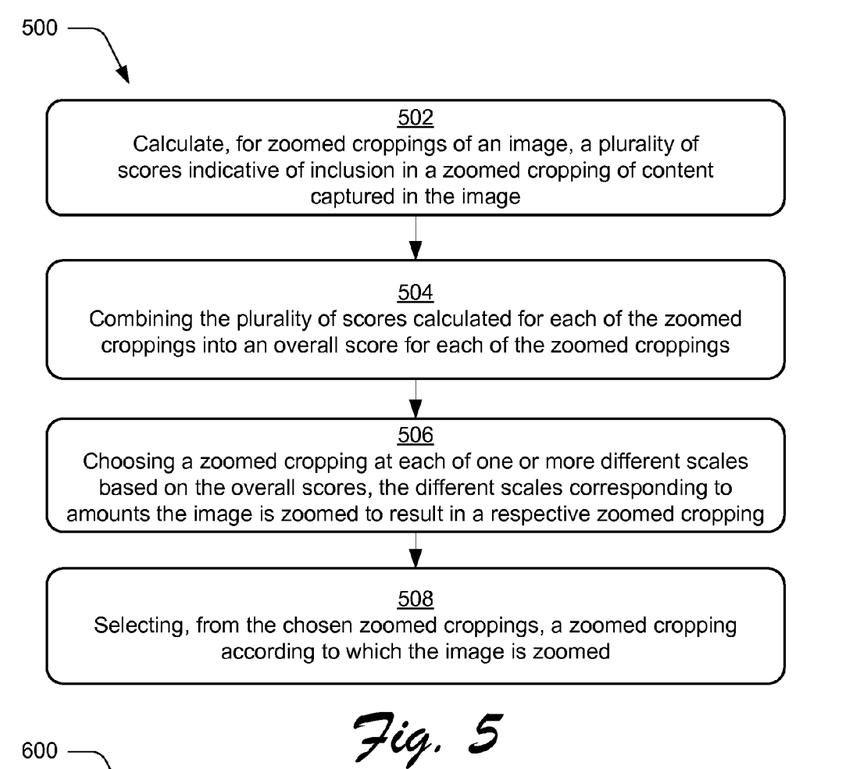
FIG. 5 is a flow diagram depicting a procedure in an example implementation in which scores indicative of image content inclusion are computed for zoomed croppings at multiple different zooming scales and a zoomed cropping is selected for effectuating the zoom operation.

FIG. 5 depicts an example procedure 500 in which scores indicative of image content inclusion are computed for zoomed croppings at multiple different zooming scales, and a zoomed cropping is selected for effectuating the zoom operation. For each of multiple zoomed croppings of an image, a plurality of scores are calculated that are indicative of inclusion in a zoomed cropping of content captured in the image (block 502). By way of example, the zoomed cropping module 112 employs the center analysis module 204 and the region of interest module 206 to compute scores indicative of a degree to which each of the croppings includes salient content of the image, a degree to which the salient content included in the candidate zoomed croppings is centered, and a degree to which the zoomed croppings preserve regions-to-keep and exclude regions-to-remove. The scores computed for each zoomed cropping is then combined into an overall score for the zoomed cropping (block 504). For example, the zoomed cropping module 112 combines the plurality of scores computed for zoomed cropping 314 into a single score. The zoomed cropping module 112 also performs this score combining for the other zoomed croppings, such that each of the zoomed croppings corresponds to an overall score.

Based on the overall score computed for each of the zoomed croppings, a zoomed cropping is chosen at each of one or more different scales (block 506). The different scales of the zoomed croppings correspond to amounts that the image is zoomed to result in a respective zoomed cropping. By way of example and not limitation, scales at which the image may be zoomed to result in the zoomed croppings include 2× zoom, 4× zoom, 16× zoom, and so forth. Consider an example in which multiple croppings of an image are generated having 2× zoom, multiple croppings generated having 4× zoom, and multiple croppings generated having 16× zoom. In such an example, the zoomed cropping module 112 chooses a zoomed cropping at each of the scales, e.g., a zoomed cropping having 2× zoom, a zoomed cropping having 4× zoom, and a zoomed cropping having 16× zoom. The particular croppings may be chosen by the zoomed cropping module 112 because they are the highest-scored zoomed cropping at the respective scale. In other words, the highest-scored zoomed cropping having 2× zoom may be chosen by the zoomed cropping module 112, the highest-scored zoomed cropping having 4× zoom may be chosen by the zoomed cropping module 112, and so forth. The chosen zoomed croppings may be placed in a list of zoomed croppings.

From the chosen zoomed croppings, a zoomed cropping is selected according to which the image is to be zoomed (block 508). For example, the zoomed cropping 314 is selected, and the zoomed cropping module 112 zooms the image 302 according to the zoomed cropping 314. Further, the zoomed cropping module 112 may cause each of the chosen croppings (e.g., a highest-scoring cropping at each of the different scales) to be displayed via a user interface and enable a user to select which zoomed cropping to use to effectuate the zoom. Alternately, the zoomed cropping module 112 may automatically select a zoomed cropping from the chosen croppings. The zoomed cropping module 112 may do so by computing a selection score for each of the chosen croppings in the manner described above. The zoomed cropping module 112 may then select the zoomed cropping having the highest selection score, and zoom the image according to the zoomed cropping that it selects.

Figure 6:
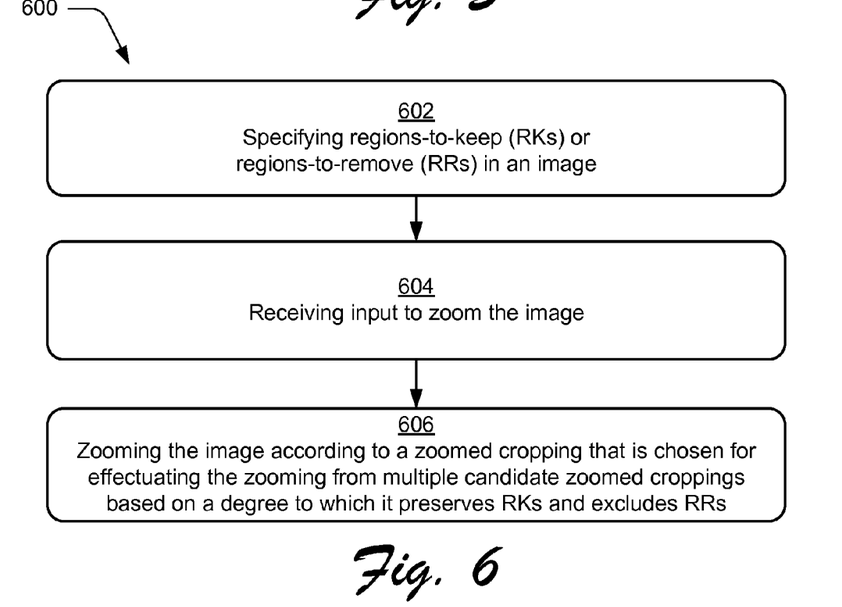
FIG. 6 is a flow diagram depicting a procedure in an example implementation in which an image is zoomed according to a zoomed cropping that is chosen from multiple candidate zoomed croppings based on a degree to which the zoomed cropping preserves specified regions-to-keep and excludes regions-to-remove.

FIG. 6 depicts an example procedure 600 in which an image is zoomed according to a zoomed cropping that is chosen from multiple candidate zoomed croppings based on a degree to which the zoomed cropping preserves specified regions-to-keep and excludes regions-to-remove. At least one region of an image is specified as a region-to-keep or a region-to-remove (block 602). For example, a facial recognition module may recognize that a region of the image 302 corresponding to the region-to-keep 402 corresponds to a person's face. The facial recognition module may indicate to the zoomed cropping module 112 that this region is recognized a face of the person 306 depicted in the image 302. By doing so the zoomed cropping module 112 may specify the face of the person 306 as the region-to-keep 402. In addition or alternately, a region-to-keep or a region-to-remove may be specified according to user input. By way of example, a user may provide input using the cursor 418 to indicate regions of the image 302 to keep and regions of the image to remove. It should be appreciated, that regions-to-keep and regions-to-remove may be specified in several other ways without departing from the spirit of the techniques described herein.

An input is received to zoom the image (block 604). For example, a user may perform photo processing operations on the image 302 in a photo editing application. The photo editing application may include a control (e.g., such as a menu item) that is selectable by the user to perform a zooming operation. In addition or alternately, a user may view an image in real-time through a view finder of a camera (e.g., a camera phone, point-and-shoot digital camera, digital SLR camera, and so on). The device may include a physical control (e.g., a button) that is selectable to initiate a zoom operation.

After an input is received to zoom an image, the image may be zoomed according to a zoomed cropping that is chosen from multiple candidate zoomed croppings (block 606). The zoomed cropping chosen for effectuating the zoom is chosen based in part on a degree to which it preserves specified regions-to-keep and excludes regions-to-remove. The multiple zoomed croppings may be considered "candidate" croppings because some of them may eventually be chosen to effectuate the zoom while others are not. Consider an example, in which the zoomed cropping module 112 generates a list of candidate croppings of the image 302 that includes a highest-scoring zoomed cropping at each of multiple different zooming scales. From this list, the zoomed cropping module 112 may choose one zoomed cropping according to which the image 302 is to be zoomed. The zoomed cropping module may choose the one zoomed cropping based in part on a degree to which the one zoomed cropping includes the regions-to-keep 402, 404, 406 and excludes the regions-to-remove 408, 410, 412, 414, 416.

Once the zoomed cropping module 112 chooses a zoomed cropping from among the candidate zoomed croppings, the zoom may be applied. For example, the zoomed cropping module 112 crops the image according to the selected zoomed cropping by removing (or hiding) portions of the image outside of the selected zoomed cropping window and retaining the portions within.

Having described example procedures in accordance with one or more implementations, consider now an example system and device that can be utilized to implement the various techniques described herein.

Example System and Device

Figure 7:
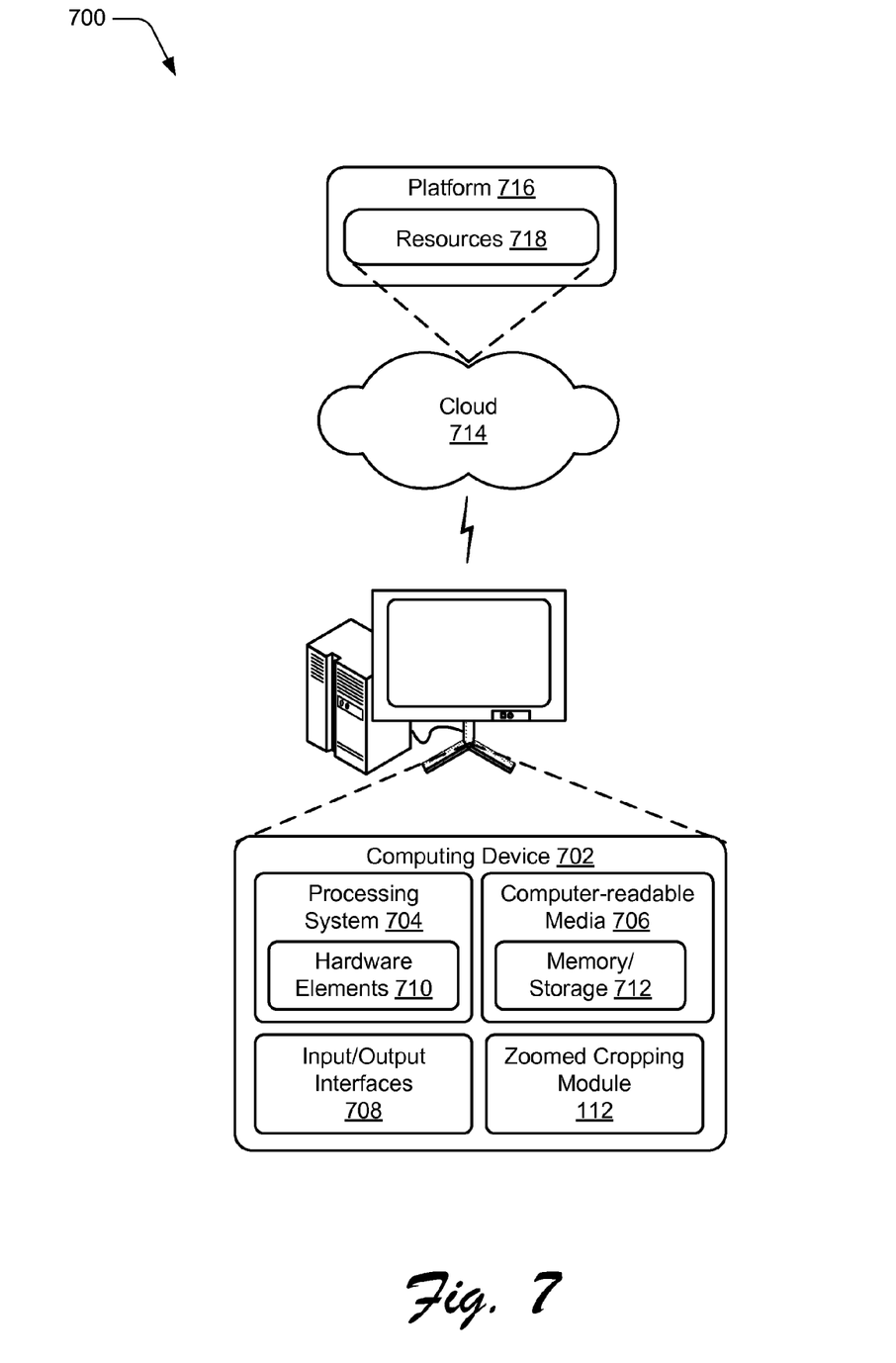
FIG. 7 illustrates an example system including various components of an example device that can be employed for one or more implementations of image zooming that are described herein.

FIG. 7 illustrates an example system generally at 700 that includes an example computing device 702 that is representative of one or more computing systems and/or devices that may implement the various techniques described herein. This is illustrated through inclusion of the zoomed cropping module 112, which operates as described above. The computing device 702 may be, for example, a server of a service provider, a device associated with a client (e.g., a client device), an on-chip system, and/or any other suitable computing device or computing system.

The example computing device 702 includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device implementation, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   generating, by a computing device, data indicative of candidate zoomed croppings of an image, the generated data indicating for the candidate zoomed croppings a respective portion of content captured in the image and a respective one of a plurality of predefined zoom levels, the zoom levels describing an amount the image is scaled, and the candidate zoomed croppings including multiple said candidate zoomed croppings at a predefined zoom level;

calculating, by the computing device and for each candidate zoomed cropping of the image, a zooming score, in part, by:
  computing a smaller-centered-region of a candidate zoomed cropping; and
  determining portions of salient content of the image included in the smaller-centered-region of the candidate zoomed cropping;

selecting, by the computing device, at least one of the candidate zoomed croppings at each of the predefined zoom levels according to the zooming scores; and displaying, by the computing device, a selected candidate zoomed cropping.

2. A method as described in claim 1, wherein each of the zoomed croppings has a same aspect ratio as the image.

3. A method as described in claim 1, wherein the zooming score combines a plurality of zooming characteristic scores including a zooming characteristic score indicative of a degree to which the zoomed croppings include salient content of the image.

4. A method as described in claim 1, wherein the zooming score combines a plurality of zooming characteristic scores including a zooming characteristic score indicative of a degree to which salient content included in the zoomed croppings is centered in the zoomed croppings.

5. A method as described in claim 1, wherein the zooming score combines a plurality of zooming characteristic scores including a zooming characteristic score indicative of a degree to which the zoomed croppings preserve regions-to-keep.

6. A method as described in claim 5, wherein a region of the regions-to-keep is specified automatically without user interaction.

7. A method as described in claim 5, wherein a region of the regions-to-keep is specified according to user input.

8. A method as described in claim 1, wherein the zooming score combines a plurality of zooming characteristic scores including a zooming characteristic score indicative of a degree to which the zoomed croppings exclude regions-to-remove.

9. A method as described in claim 8, wherein a region of the regions-to-remove is specified automatically without user interaction.

10. A method as described in claim 8, wherein a region of the regions-to-remove is specified according to user input to remove the region from the image.

11. A method as described in claim 1, further comprising calculating the zooming scores for additional zoomed croppings of the image, the additional zoomed croppings each corresponding to a different zoom level than the zoomed croppings, the different zoom level describing an amount the image is scaled.

12. A method as described in claim 11, further comprising:
  choosing one of the additional zoomed croppings at the different zoom level based on the zooming scores calculated for the additional zoomed croppings; and
  selecting, from the chosen zoomed croppings and the chosen additional zoomed croppings, a zoomed cropping according to which the image is to be zoomed.

13. A method as described in claim 1, wherein calculating the zooming scores further comprises combining a plurality of zooming characteristic scores, in part, by weighting the plurality of zooming characteristic scores with a respective weight.

14. A method comprising:
  obtaining, by a computing device, input to initiate zooming of a scene;
  responsive to obtaining the input, generating, by the computing device, data indicative of a selected zoomed cropping of the scene that is selected from data indicative of candidate zoomed croppings of the scene, the selected zoomed cropping being selected based on an overall score computed by the computing device by combining a plurality of zooming characteristic scores assigned to the candidate zoomed croppings, including:
    a first zooming characteristic score reflecting a first assessment by the computing device of a degree to which the candidate zoomed croppings include salient content of the scene;
    a second zooming characteristic score reflecting a second assessment by the computing device of a degree to which the salient content included in the candidate zoomed croppings is centered, the second assessment including generating data indicative of centered regions of the candidate zoomed croppings and determining portions of the salient content included in the centered regions, the generated data indicative of the centered regions indicating the centered regions are smaller than the candidate zoomed croppings; and
    a third zooming characteristic score reflecting a third assessment by the computing device of a degree to which the zoomed croppings preserve regions-to-keep and exclude regions-to-remove; and
  zooming, by the computing device, from a display of the scene to a display of the selected zoomed cropping.

15. A method as described in claim 14, wherein each of the centered regions has a same aspect ratio as the respective candidate zoomed cropping.

16. A method as described in claim 14, wherein:
  each of the candidate zoomed croppings is zoomed by one of a plurality of predefined zoom levels that describe an amount the scene is scaled; and
  the selected zoomed cropping is selected from a list of the candidate zoomed croppings generated to include a highest-scoring candidate zoomed cropping at each of the plurality of predefined zoom levels.

17. A method as described in claim 14, further comprising:
  receiving a selection via a user interface that includes the display of the selected zoomed cropping; and
  capturing a zoomed image of the scene according to the selected zoomed cropping.

18. A system comprising:
  a processor; and
  a memory having computer-readable instructions stored thereon that are executable by the processor to perform operations comprising:
    generating data indicative of specified regions-to-keep or regions-to-remove in an image;
    receiving input via an interface of the system to zoom the image;
    computing a region-of-interest (ROI) score for multiple candidate zoomed croppings of the image, the ROI score indicating a degree to which a zoomed cropping preserves the specified regions-to-keep and excludes the specified regions-to-remove and being computed, in part, by determining a ratio of a number of the specified regions-to-keep included in the zoomed cropping and a number of the specified regions-to-remove outside the zoomed cropping to a total number of the regions-to-keep specified and a total number of the regions-to-remove specified;

generating digital content configured as a zooming of the image based on a chosen zoomed cropping that is chosen from the multiple candidate zoomed croppings based, at least in part, on the ROI score; and presenting the digital content indicative of the zooming via a display device.

19. A system as described in claim 18, wherein a specified region-to-keep or specified region-to-remove corresponds to an object recognized in the image automatically by an object detection technique.

20. A system as described in claim 18, wherein a specified region-to-keep or specified region-to-remove is specified according to user input.

\* \* \* \* \*